United States Patent [19]
Yoshino

[11] Patent Number: 5,628,423
[45] Date of Patent: May 13, 1997

[54] CONTAINER/CLOSURE LOCK DEVICE

[75] Inventor: Hidezo Yoshino, Tokyo, Japan

[73] Assignee: Hirayama Manufacturing Corporation, Tokyo, Japan

[21] Appl. No.: 540,829

[22] Filed: Oct. 11, 1995

[51] Int. Cl.$^6$ ................................................ B65D 45/32
[52] U.S. Cl. ........................................ 220/319; 215/274
[58] Field of Search ................................ 220/315, 319; 215/274

[56] References Cited

U.S. PATENT DOCUMENTS

| | | | |
|---|---|---|---|
| 1,793,974 | 2/1931 | Stant | 220/319 |
| 1,848,954 | 3/1932 | Jarvis | 220/319 |
| 2,022,868 | 12/1935 | Nelson | 220/319 X |
| 3,951,300 | 4/1976 | Kalasek | 220/327 |
| 4,775,074 | 10/1988 | Ershig | 220/323 |
| 5,445,293 | 8/1995 | Schutz | 220/319 |

FOREIGN PATENT DOCUMENTS

| | | | |
|---|---|---|---|
| 63-172062 | 7/1988 | Japan . | |
| 613802 | 12/1948 | United Kingdom | 220/319 |

*Primary Examiner*—Stephen K. Cronin
*Attorney, Agent, or Firm*—Jacobson, Price, Holman & Stern, PLLC

[57] ABSTRACT

There is provided a container/closure lock device that is safe, simple and down-sized with a reduced number of components and can be manufactured at reduced cost. A container is provided with brackets 14a through 14f for receiving the wall of a closure, each of said brackets 14a through 14f being provided with a through bore 17 bored through its arm 16. Pin holders 19a through 19f having respective channels 22 are fitted to the respective outer surfaces of the corresponding brackets 14a through 14f, the through bores 17 and the corresponding channels 22 being aligned respectively. Lock pins 26a through 26f are respectively inserted into and held to the corresponding channels 22. A rotary ring 29 provided with slots 30a through 30f is fitted to the outer peripheral surface of the container 11 in such a way that the slots 30a through 30f respectively intersect the corresponding lock pins 26a through 26f. Guide pins 31a through 31f are respectively made to pass through the corresponding slots 30a through 30f and the corresponding lock pins 26a through 26f. The wall 34 of the cap-type closure 33 is provided with lock holes 35a through 35f for receiving corresponding lock pins.

11 Claims, 3 Drawing Sheets

CONTAINER/CLOSURE LOCK DEVICE

BACKGROUND OF THE INVENTION

1. Field of the Invention

This invention relates to a container/closure lock device for a cap-type closure to be used on a container in order to hermetically seal the opening of the container.

2. Prior Art

A variety of cap-type closures have been proposed for pressure vessels (high pressure vessels) to be used for sterilization and other applications. Means for securely holding such a closure to a pressure container in order to hermetically seal the opening thereof include combinations of external and internal threads for screw engagement of the container and the closure, bolt-nut combinations and clamps.

Of these, the screw engagement of an externally threaded closure and an internally threaded container or vice versa requires a cumbersome and painstaking operation and it is often difficult to tightly screw the closure onto the container by hand particularly if a large container is involved. On the other hand, a type of lock device comprising a number of paired bolts and nuts requires a number of steps of operation before the closure is properly and airtightly fitted to the container or removed from the container.

Japanese Patent Publication No. 63-172062 discloses a container/closure lock device comprising a number of removable pins to cope with the above problems and other problems.

A container and a closure provided with a container/closure lock device according to the above invention respectively have a number of lock holes to form, when combined, lock hole pairs, the lock holes of the container being arranged along the periphery of the opening thereof, those of the closure being arranged along the peripheral wall thereof. The pairs of lock holes are removably provided with respective lock pins that can be handled by way of an annular rotary plate arranged on the periphery of the opening of the container and respective slide bars.

The above described known device is advantageous in that the closure can be removably fitted to the opening of the container in a highly efficient way without requiring any effort because the lock pins can be fitted into the respective pairs of lock holes by a single operation of turning the rotary plate clockwise and then removed from the respective pairs of lock holes also by a single operation of turning the rotary place counterclockwise.

Problems to be Solved by the Invention

However, the above described know container/closure lock device is also accompanied by certain drawbacks. Firstly, the device is bulky and comprises a large number of components to make it poorly adaptable to cost reduction as the rotary plate has to be extended outwardly from the periphery of the opening of the container in order to carry a number of slide bars and related parts on it.

Secondly, the slide bars, arms and other movable components of the device are exposed and likely to collide with foreign objects to give rise to unforeseeable accidents. If the devices is additionally provided with a cover to protect such components, the entire device becomes even more bulky with an increased number of components.

SUMMARY OF THE INVENTION

In view of the above identified problems and other problems of the existing devices of the category under consideration, it is therefore the object of the invention to provide a container/closure lock device that is safe, simple and down-sized with a reduced number of components and can be manufactured at reduced cost.

According to the invention, the above object is achieved by providing a container/closure lock device for locking a cap-type closure fitted to the opening of a container characterized in that the container is provided on the outer surface of the peripheral wall and close to the opening thereof with at least a bracket having an arm for receiving the wall of the closure between the arm and the outer surface of the peripheral wall of the container and a through bore is formed through the arm of the bracket in order to removably receive a lock pin, that a pin holder having a channel for holding the lock pin is secured to the outer surface of the arm of the bracket, said through bore for removably receiving the lock pin being aligned with the channel for holding a lock pin, that the lock pin is passed through the channel and the corresponding through bore to move into and out of the gap between the inner surface of the arm of the bracket and the outer surface of the peripheral wall of the container, that a rotary ring having a slot for guiding a guide pin is provided and fitted to the outer periphery of the opening of the container with the slot located directly above the lock pin, said slot being arranged obliquely so as to intersect a radial line and a circle coaxial with the ring, that a guide pin is provided and made to pass through the slot and the corresponding lock pin in order to securely link the ring and the clock pin and that the closure is provided on the wall thereof with a lock hole for receiving the lock pin.

Preferably the container is provided on the outer surface of the peripheral wall and close to the opening thereof with a plurality of brackets, each carrying on the outer surface of its arm a pin holder having a channel for holding a lock pin and the rotary ring has slots for guiding guide pins for securely linking the ring and the respective lock pins, the closure being provided on the wall thereof with lock holes for receiving the respective lock pins.

Alternatively, a single rotary ring is inserted into the one or more than one lock pins from the rearward and the rotary ring and the one or more than one lock pins are linked together by one or more than one guide pins.

Still alternatively, a pair of rotary rings are arranged to hold the outer peripheral surface of the one or more than one lock pins therebetween and the rotary ring and the one or more than one lock pins are linked together by one or more than one guide pins.

Still alternatively, a single rotary ring is arranged on the lock pins and the rotary ring and the one or more than one lock pins are linked together by one or more than one guide pins.

Still alternatively, a single rotary ring is arranged under the lock pins and the rotary ring and the one or more than one lock pins are linked together by one or more than one guide pins.

As a closure is fitted to a corresponding container provided with a container/closure lock device according to the inventions, the edge portion of the closure moves into the one or more than one gaps between the container and the one or more than one brackets.

When the through bores of the brackets are aligned with the respective lock holes of the closure under this condition, the container and the closure are securely held together as the lock pins are introduced into the respective through bores and locks holes and become removable from each other as the lock pins are withdrawn from the respective through bores and lock holes.

The operation of unlocking the closure can be achieved by rotating the rotary ring. As the ring is turned clockwise, the one or more than one guide pins are forced to move along the respective slots from the distal end toward the proximal end and by turn eventually force the respective lock pins held in the respective brackets to move into the corresponding through bores and the lock holes to put the container and the closure into a locked state. On the other hand, as the ring is turned counterclockwise, the guide pins are forced to move along the respective slots from the proximal end toward the distal end and eventually force the respective lock pins to move out of the lock holes to release the container and the closure from the locked state.

DETAILED DESCRIPTION OF THE PREFERRED EMBODIMENTS

Now, the present invention will be described in greater detail by referring to the accompanying drawings that illustrate preferred embodiments of container/closure lock device according to the invention.

Figure 1A:
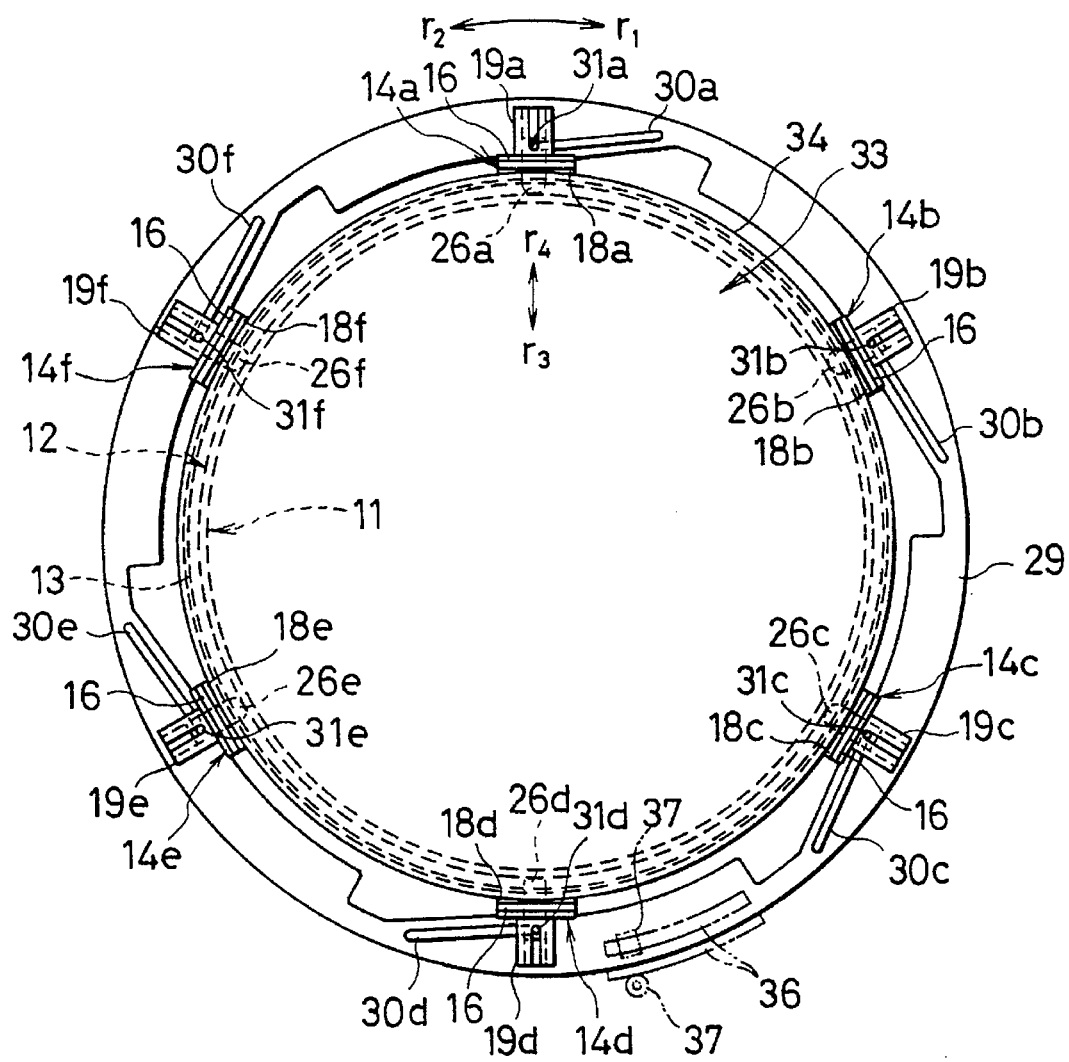
In FIG. 1, (A) is a schematic plan view of a closure provided with an embodiment of container/closure lock device according to the invention, said closure being in a locked state, and (B) is a schematic partial plan view of the closure in an unlocked state.
Figure 1B:
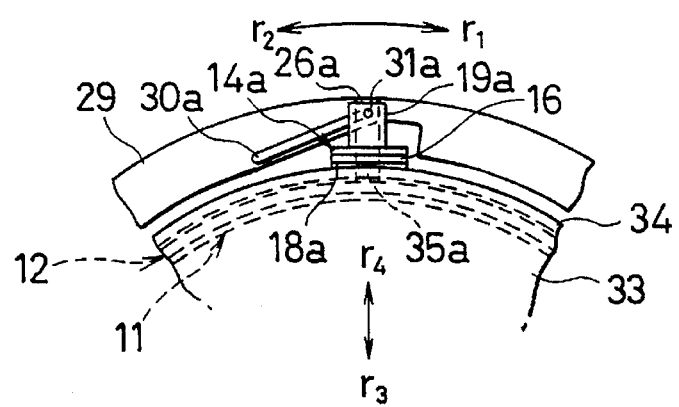
Figure 2:
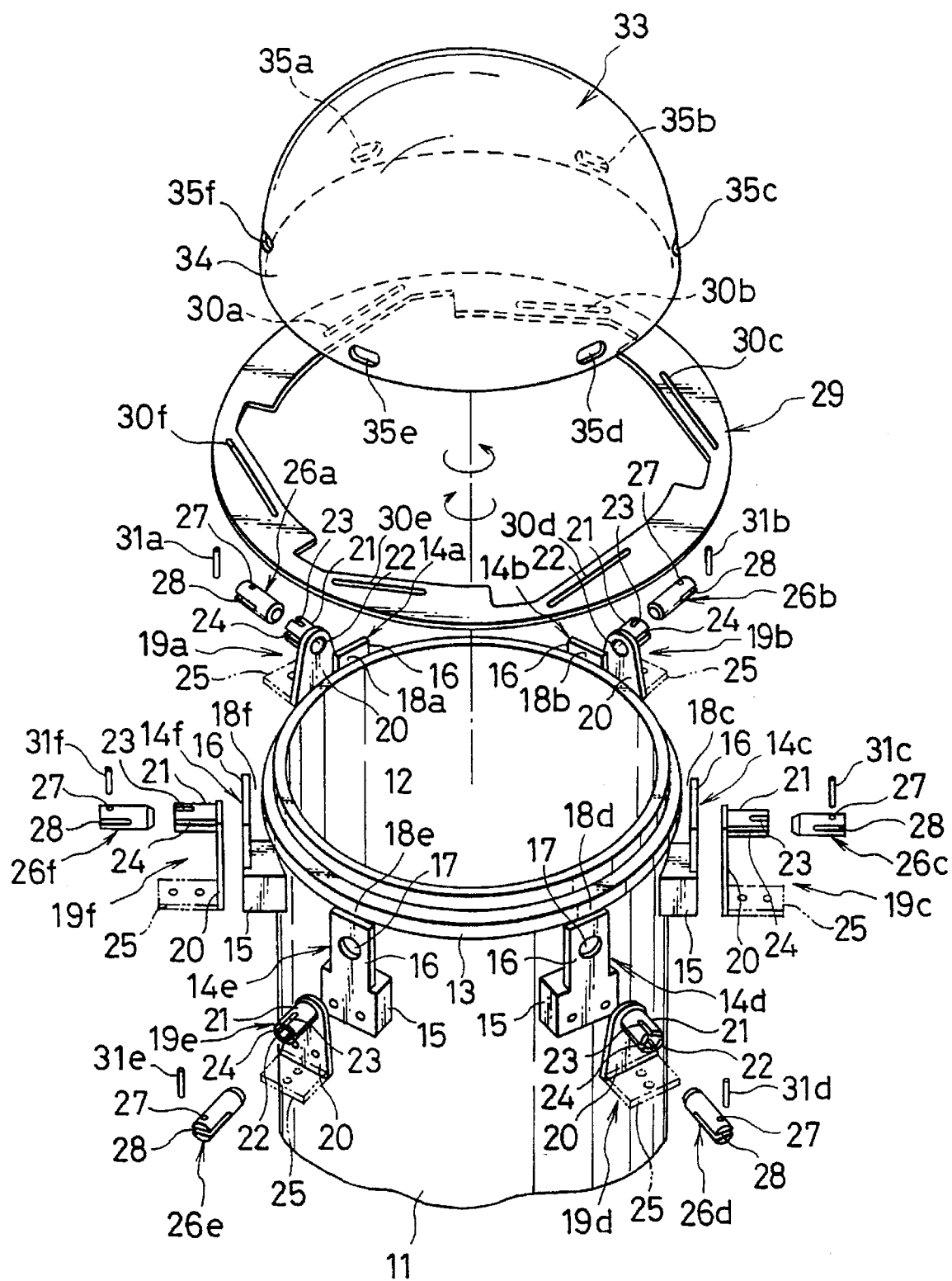
FIG. 2 is an exploded schematic perspective view of a container/closure assembly provided with the embodiment of container/closure lock device of FIG. 1.

Referring firstly to FIGS. 1 through 3 illustrating a first preferred embodiment of container/closure lock device of the present invention, reference numeral 11 generally denotes a cylindrical hollow container 11 having a bottom, said container comprising a annular flange 13, a plurality of brackets 14a through 14f, pin holders 19a through 19f, substantially cylindrical lock pins 26a through 26f, a rotary ring 29 and guide pins 31a through 31f. Reference numeral 33 denotes a corresponding cap-type closure.

The cylindrical container 11 has an opening 12 disposed at the top thereof.

The annular flange 13 has an inner diameter corresponding to the outer diameter of the cylindrical container 11 and secured to the outer peripheral surface of the container as an integral part thereof.

Each of the brackets 14a through 14f has a substantially cubic base section 15 and an arm 16 standing from an outer portion of the base section 15, said arm 16 being provided with a through bore 17.

The brackets 14a through 14f are regularly spaced apart and fitted to the outer surface of the peripheral surface of the container at locations close to the opening 12.

As the brackets 14a through 14f are secured to the outer surface of the peripheral wall of the container 11, a gap is formed between each of the arms 16 and the outer surface of the peripheral wall of the container 11. These gaps of the brackets 14a through 14f are respectively denoted by 18a through 18f.

Each of the pin holders 19a through 19f comprises a substantially triangular plate member 20 and a hollow cylindrical member 21 extending outwardly from the outer surface of the plate member 20. The plate member is provided with a through bore aligned with the hollow inner space of the cylindrical member 21, which is also cylindrical, and the through bore of the plate member and the hollow inner space of the cylindrical member 21 provide a channel for holding a lock pin.

Each of the cylindrical member 21 is additionally provided with a pair of oppositely disposed upper and lower longitudinal slits 23 and a pair of oppositely disposed lateral slits 24.

As will be described in greater detail hereinafter, the pin holders 19a through 19f are arranged on and secured to the respective outer surfaces of the brackets 14a through 14f with the pin holding channels aligned with the corresponding through bores.

Each of the substantially cylindrical lock pins 26a through 26f has an outer diameter adapted to snugly slide through the corresponding channel 22 and through bore 17. It also has a tapered front end portion.

Each of the lock pins 26a through 26f is provided at a location close to the rear end thereof with a vertical guide pin receiving hole 27 and at the rear end with a horizontal slit 28 for receiving the rotary ring, said slit 28 intersecting the longitudinal axis of the lock pin.

When the lock pins 26a through 26f are held in the respective channels 22 of the pin holders 19a through 19f, they can be linked with the rotary ring 29 by means of the respective guide pins 31a through 31f, which will be discussed in detail hereinafter.

The rotary ring 29 has an inner diameter greater than the outer diameter of the peripheral wall of the container 11 and so configured that its inner edge may be inserted into the horizontal slits 24 of the pin holders 19a through 19f.

The outer periphery of the rotary ring 29 is circular; whereas its inner periphery has a complex profile involving linear sections, arc sections and recessed sections.

The guide pins 31a through 31f are provided to link the respective lock pins 26a through 26f and the rotary ring 29. The guide pins 31a through 31f have an outer diameter adapted to snugly move into the longitudinal slits 23 of the respective pin holders 19a through 19f, the pin receiving holes 27 of the respective lock pins 26a through 26f and the respective slots 30a through 30f of the rotary ring 29 and a length exceeding the outer diameter of the cylindrical members 21 of the pin holders 19a through 19f.

The pin holders 19a through 19f, the lock pins 26a through 26f, the rotary ring 29 and the guide pins 31a through 31f are assembled in a manner as described hereinafter and the assembled entity is fitted to the outer surface of the peripheral wall of the container 11 as illustrated in FIGS. 1 through 3.

Firstly, each of the lock pins 26a through 26f is introduced into the channel 22 of a corresponding one of the pin holders 19a through 19f with the longitudinal slits 23 and the horizontal slits 24 of the pin holder aligned respectively with the pin receiving hole 27 and the horizontal slit 28 of the lock pin.

Secondly, the inner edge of the rotary ring 29 is inserted into the aligned horizontal slits 23 and 28 and the slot 30a through 30f of the rotary ring 29 are aligned respectively with the longitudinal slits 23 and the pin receiving holes.

Subsequently, the guide pins 31a through 31f are introduced respectively into the horizontal slits 23, the pin receiving holes 27 and the slots 30a through 30f and held to this engaged state by means of respective washers 32 arranged at the opposite ends of the guide pins 31a through 31f.

Then, the pin holders 19a through 19f are pressed at the inner surface thereof against the respective brackets 14a through 14f at the outer surface thereof and secured to the respective brackets 14a through 14f.

As described earlier, the cap-type closure 33 matches the cylindrical container 11 and has a vaulty wall 34 provided with lock holes 35a through 35f.

The vaulty wall 34 of the closure 33 has such inner and outer diameters that it may be snugly received by the gaps 18a through 18f arranged along the outer surface of the peripheral wall of the container 11 and the lock holes 35a through 35f of the vaulty wall 34 of the closure 33 are regularly spaced apart in such a way that they may be radially aligned with the respective lock pins 26a through 26f to provide a 1 to 1 correspondence.

The container 11, the closure 33 and the lock device of the above embodiment are made of metal, synthetic resin (including FRP), a ceramic material or a combination of any of them having desirable mechanical properties and resistance against heat and corrosion. If any two or more than two of the components (members) of the container, the closure and the lock device have to be mutually secured or bonded, any known welding, fusion, adhesion or bolting technique may be appropriately used.

If the components (members) are made of metal, for example, the flange 13 and the brackets 14a through 14f may be welded to the outer surface of the peripheral wall of the closure 11, whereas the pin holders 19a through 19f may be secured to the respective brackets 14a through 14f by means of bolts of any known types.

Figure 3A:
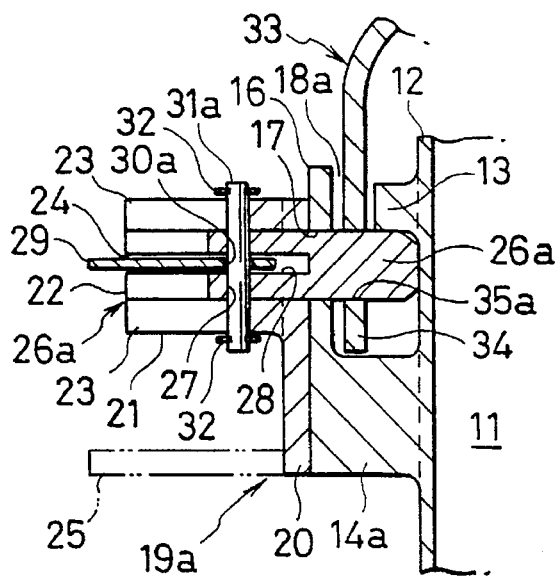
In FIG. 3, (A) is a schematic partial cross sectional view of the embodiment of container/closure lock device of FIG. 1 with the closure in a locked state and (B) is a corresponding view with the closure in an unlocked state.

When the above described embodiment of container/closure lock device is in a locked state as illustrated in FIGS. 1(A) and 3(A), an edge portion of the vaulty wall 34 of the closure 33 closing the opening 12 of the container 11 is caught in the gaps 18a through 18f and the lock pins 26a through 26f respectively found in the through bores 17 and the lock holes 35a through 35f to securely link the container 11 and the closure 33 so that the closure 33 would not come out of the opening 12 of the container 11.

Under this locked state, the rotary ring 29 has been rotated clockwise and angularly displaced in the sense indicated by arrow r1 in FIG. 1 and the guide pins 31a through 31f have been radially and inwardly displaced in the direction indicated by arrow r3 in FIG. 1 and located at the respective proximal ends of the slots 30a through 30f.

If the rotary ring 29 is turned counterclockwise from the locked position of FIGS. 1(A) and 3(A) in the sense indicated by arrow r2 in FIG. 1, the guide pins 31a through 31f are moved along the respective slots 30a through 30f from the proximal ends toward the distal ends to by turn respectively move the lock pins 26a through 26f radially and outwardly in the direction indicated by arrow r4 in FIG. 1 until the lock pins 26a through 26f are completely moved out of the respective lock holes 35a through 35f.

Figure 3B:
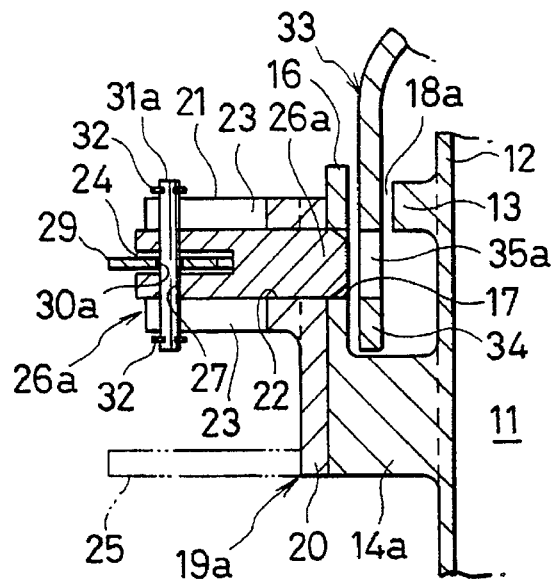

Now, the container 11 and the closure 33 are released from the locked state as shown in FIGS. 1(B) and 3(B) and, therefore, the closure 33 is ready to be removed from the opening 12 of the container 11.

If the rotary ring 29 is rotated clockwise again from the unlocked state of FIGS. 1(B) and 3(B) in the sense indicated by arrow r1 in FIG. 1, the guide pins 31a through 31f are moved along the respective slots 30a through 30f from the distal ends toward the proximal ends to displace the respective lock pins 26a through 26f radially and inwardly along the direction indicated by arrow r3 until the lock pins 26a through 26f move into the respective lock holes 35a through 35f.

Thus, the container 11 and the closure 33 are put in a locked state.

The above described combination of the closure 33 and the container 11 is typically designed as a pressure vessel (high pressure vessel).

It may be particularly convenient if such a container 11 and a closure 33 are provided with marks indicating the locations of the lock pins 26a through 26f arranged on the container 11 and those of the lock holes 35a through 35f arranged on the closure 33.

In the above described embodiment, the flange 13 is so located that the front end of each of the lock pins 26a through 26f abuts the lower surface of the flange 13 in a locked state as may be seen from FIG. 3(A).

In such a case, if the locked closure 33 is subjected to an external force trying to move it away from the opening 12 of the container 11, the flange 13 holds the front ends of the lock pins 26a through 26f securely in position against the external force in order to maintain the locked state of the closure 33.

Thus, the flange 13 is a component that is preferably used but not indispensable for the purpose of the invention.

Alternatively, the flange 13 may be replaced by a plurality of smaller members bonded to and extending outwardly from the outer surface of the peripheral wall of the container 11 like the brackets 14a through 14f.

Still alternatively, the brackets 14a through 14f may be replaced by a single annular member that operates like the brackets for the purpose of the invention.

The plate member 20 of each of the pin holders 19a through 19f may be formed integrally with a seat plate member 25 extending radially outwardly from the lower end of the plate member 20.

Each of the pin holders 19a through 19f may be realized simply as a hollow cylindrical member 21, which is rigidly secured to a corresponding one of the brackets 14a through 14f.

Since the pin holders 19a through 19f are bonded to the respective brackets 14a through 14f in any of the embodiments described in the present specification, they are in fact integral with the respective brackets 14a through 14f.

For the purpose of the invention, the outer and/or inner periphery of the rotary ring 29 may be circular and/or polygonal and/or of a complex profile.

If a plurality of lock pins 26a through 26f are used and the rotary ring 29 has polygonal outer and inner peripheries, the number of edges of the polygonal outer periphery and that of the polygonal inner periphery are preferably same as that of the lock pins 26a through 26f, or six for the above embodiment to make the rotary ring hexagonal.

The slots 30a through 30f of the rotary ring 29 may be linear or curved so long as each of them intersects a radial line and a circle coaxial with the rotary ring.

Figure 4:
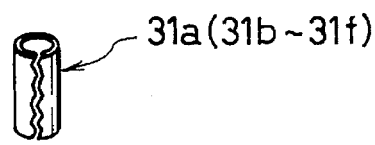
FIG. 4 is a schematic perspective view of an alternative guide pin that can be used for the embodiment of FIG. 1.

In the above described embodiment, the guide pins 31a through 31f may be replaced by so many spring pins as typically shown in FIG. 4.

As well known, a spring pin is a tubular object made of a resilient material and having a longitudinal slit running all the way along its entire length so that it shows a remarkable resiliency against any radial deformation.

If spring pins are used to link the rotary ring 29 and the respective lock pins 26a through 26f, they are introduced into the respective pin receiving holes 27 of the lock pins 26a through 26f and the respective slots 30a through 30f of the rotary ring 29 as the lock pins and the corresponding slots are aligned to provide a 1 to 1 correspondence of 26a:30a, 26b:30b, 26c:30c, 26d:30d, 26e:30e and 26f:30f.

The lock pins 26a through 26f and the rotary ring 29 are linked appropriately if certain requirements such as D1>d1, D2<d2 and L1≦ are met, where D1 is the outer diameter of the spring pins when they are not deformed, D2 is the outer diameter of the spring pins when they are deformed, L1 is the length of the spring pins, d1 is the diameter of the pin receiving holes 27, d2 is the width (shorter diameter) of the slots 30a through 30f and L2 is the length of the pin receiving holes 27 (or the diameter of the lock pins).

If spring pins are used, the longitudinal slits of the pin holders 19a through 19f may be replaced by so many holes for receiving the respective spring pins.

In the above described embodiments, the brackets 14a through 14f, the pin holders 19a through 19f, the lock pins 26a through 26f and the guide pins 31a through 31f may be replaced by a single bracket, a single pin holder, a single lock pin and a single guide pin to produce a similar locking effect if they are combined with the rotary ring 29 and a single lock hole of the closure 33. Note, however, that the use of more than one pieces for each of the above listed items in combination with a rotary ring 29 and a corresponding number of lock holes of the closure 33 is recommendable to realize a reliable container/closure lock device.

A reversible motor may be used to rotate the rotary ring 29 of the above described embodiment. If such is the case, a rack 36 as schematically shown in FIG. 1(A) is arranged on the upper surface, the lower surface or the peripheral surface of the rotary ring 29 and held in engagement with a pinion 37 of the transmission system of the motor.

Alternatively, if the rotary ring 29 is operated manually, it may be provided with one or more than one handles or knobs at appropriate locations.

The lock holes 35a through 35f formed into the vaulty wall 34 of the closure 33 of the above embodiment have an oblong profile having a relatively large diameter along the peripheral direction.

With the lock holes 35a through 35f having such a profile, the lock pins 26a through 26f may be aligned with and introduced into the respective lock holes 35a through 35f without difficulty, although the profile of the lock holes 35a through 35f is not limited thereto and may alternatively be circular (round), polygonal or irregular.

Figure 5A:
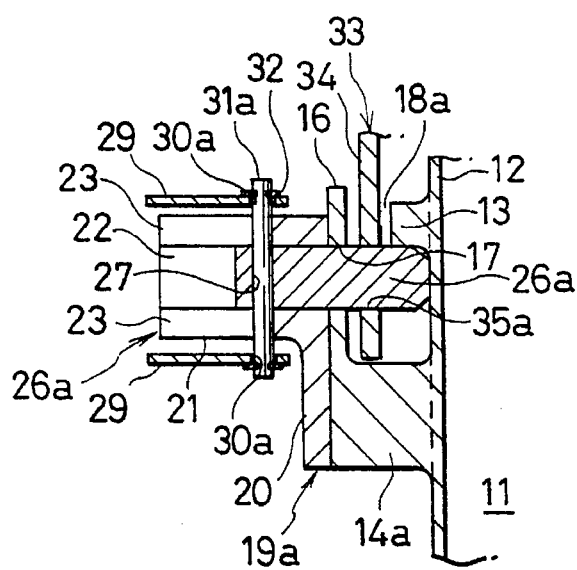
In FIG. 5, (A) is a schematic partial cross sectional view of another embodiment of container/closure lock device according to the invention with a closure in a locked state and (B) is a corresponding view with the closure in an unlocked state.
Figure 5B:
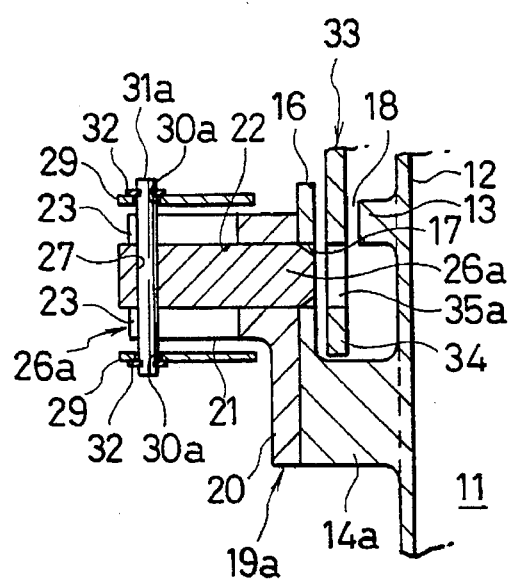

FIG. 5 is a schematic partial view of another embodiment of container/closure lock device according to the invention.

In this embodiment, a pair of rotary rings 29, each of which has a profile substantially similar to that of its counterpart of the first embodiment, are arranged on and under the hollow cylindrical members 21 of the pin holders 19a through 19f in such a way that the slots 30a through 30f of the upper rotary ring 29, the longitudinal slits 23 of the pin holders 19a through 19f, the pin receiving holes 27 of the lock pins 26a through 26f, and the slots 30a through 30f of the lower rotary ring 29 are respectively aligned so that guide pins 31a through 31f may pass therethrough to securely hold the members together.

Since a pair of rotary rings 29 are used in the embodiment of FIG. 5 to securely hold the pin holders 19a through 19f therebetween, the horizontal slits 24 of the pin holders 19a through 19f are eliminated.

Otherwise, the embodiment of FIG. 5 has operational features similar to those of the embodiment of FIGS. 1 through 4 as described above.

It may be appreciated that the closure 33 put on the container 11 may be locked and unlocked by rotating one or both of the rotary rings 29 clockwise and counterclockwise respectively.

If the two rotary rings 29 of the embodiment of FIG. 5 are linked together by some means for connecting them partly, they may be operated as an integral entity.

Either the upper ring or the lower ring may be omitted from the embodiment of FIG. 5. If such is the case, the closure 33 placed on the container 11 may be locked and unlocked by rotating the remaining rotary ring 29 clockwise and counterclockwise respectively.

Advantages of the Invention

A container/closure lock device according to the invention has the following advantages.

1. The vaulty wall of the closure having lock holes, the brackets, the pin holders, the lock pins, the rotary ring(s) and the guide pins may be dimensionally minimized and arranged only in the vicinity of the opening of the container to make the container less bulky.

2. The container/closure lock device may be realized with a minimal number of components including brackets, pin holders, lock pins, a rotary ring and guide pins to reduce the manufacturing cost of the device.

3. The guide pins and the lock pins are linked together and held close to each other by guide pins and the lock pins and the guide pins are minimally exposed so that they are least liable to collide with foreign objects and the risk of accident is minimized.

4. The closure can be locked and unlocked only by operating a rotary ring to make the operation of container/closure lock device very simple.

What is claimed is:

1. A container/closure lock device for locking a cap-type closure fitted to an opening of a container characterized in that the container is provided on an outer surface of a peripheral wall and close to the opening thereof with a bracket having an arm for receiving a wall of the closure in a gap between the arm and the outer surface of the peripheral wall of the container and a through bore formed through the arm of the bracket in order to removably receive a lock pin, that a pin holder having a channel for holding the lock pin is secured to an outer surface of the arm of the bracket, said through bore for removably receiving the lock pin being aligned with the channel for holding a lock pin, that the lock pin is passed through the channel and the corresponding through bore to move into and out of the gap between an inner surface of the arm of the bracket and the outer surface of the peripheral wall of the container, that a rotary ring having a slot for guiding a guide pin is provided and fitted to an outer periphery of the opening of the container with the slot located in alignment with the lock pin, said slot being arranged obliquely so as to intersect a radial line and a circle coaxial with the ring, that the guide pin is made to pass through the slot in the ring and the corresponding lock pin in order to securely link the ring and the lock pin and that the closure is provided on the wall thereof with a lock hole for receiving the lock pin.

2. A container/closure lock device according to claim 1, wherein the container is provided on the outer surface of the peripheral wall and close to the opening thereof with additional brackets, each additional bracket carrying on the outer surface of its arm an additional pin holder having a channel for holding an additional lock pin and the rotary ring has additional slots for guiding the additional guide pins for securely linking the additional slots in the ring and the respective additional lock pins, the closure being provided on the wall thereof with additional lock holes for receiving the respective additional lock pins.

3. A container/closure lock device according to claim 1, wherein said rotary ring is inserted into a slot in said lock pin from an outward end thereof and the rotary ring and the lock pin is linked together by said guide pin.

4. A container/closure lock device according to claim 1, wherein an additional rotary ring is connected to the lock pin, the additional rotary ring and the lock pin being linked together by the guide pin, one of said rotary rings being oriented above the lock pin and the other rotary ring being oriented below the lock pin.

5. A container/closure lock device according to claim 1, wherein said rotary ring is connected to the lock pin by the guide pin, said rotary ring being oriented below the lock pin.

6. A container/closure lock device according to claim 1, wherein said rotary ring is connected to the lock pin by the guide pin, said rotary ring being oriented below the lock pin.

7. A closure cap lock for locking a closure cap having a peripheral wall telescoped onto a peripheral wall defining an opening to be closed by the closure cap, said lock comprising a plurality of circumferentially spaced, radially movable locking pins, a plurality of circumferentially spaced brackets rigidly mounted on the peripheral wall defining the opening and outwardly of the peripheral wall of the closure cap, each of said brackets guidingly supporting a locking pin for radial inward and outward movement, said locking pins lockingly engaging the peripheral wall of the closure cap when moved to an inward position and releasing the peripheral wall of the closure cap when moved outwardly, and a locking pin actuating member simultaneously actuating all of said locking pins to move them between said inward cap locking position and said outward cap releasing position.

8. The closure cap lock as defined in claim 7 wherein said closure cap peripheral wall includes a plurality of circumferentially spaced lock holes, each of said brackets including a hole aligned with said holes in the closure cap peripheral wall when telescoped onto the peripheral wall defining the opening, said locking pins being supported by the brackets for radial movement from the holes in the brackets into the aligned lock holes in the peripheral wall of the closure cap to lock the closure cap in closed relation to the opening.

9. The closure cap lock as defined in claim 8 wherein said locking pin actuating member is an annular member extending peripherally of said brackets and lock pins and rotatable in relation thereto, a cam structure interconnecting said annular member and lock pins to move said lock pins radially inwardly and outwardly during rotation of said annular member in opposite directions.

10. The closure cap lock as defined in claim 9 wherein said cam structure includes a plurality of circumferentially spaced cam slots in said annular member, a guide pin extending through each of said cam slots and connected to a lock pin to move said lock pins inwardly and outwardly between closure cap locking and releasing positions.

11. The closure cap lock as defined in claim 8 wherein said peripheral wall defining the opening incudes a peripheral projection oriented adjacent said lock holes and bracket holes and between the opening and the aligned holes, said lock pins engaging a surface of said projection remote from the opening when moved inwardly to cap locking position.

* * * * *